US009789887B2

(12) United States Patent
Johansson et al.

(10) Patent No.: US 9,789,887 B2
(45) Date of Patent: Oct. 17, 2017

(54) BACKING RING ASSEMBLY FOR RAILCAR AXLE BEARINGS

(71) Applicants: David Johansson, Conshohocken, PA (US); Michael Duguet, Danville, PA (US); Mark A. Ussai, Lansdale, PA (US); Arnaud Duchassin, Monts (FR); Thierry Le Moigne, Luynes (FR); Jonathan Repesse, Tours (FR)

(72) Inventors: David Johansson, Conshohocken, PA (US); Michael Duguet, Danville, PA (US); Mark A. Ussai, Lansdale, PA (US); Arnaud Duchassin, Monts (FR); Thierry Le Moigne, Luynes (FR); Jonathan Repesse, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/150,933

(22) Filed: May 10, 2016

(65) Prior Publication Data

US 2016/0355196 A1    Dec. 8, 2016

Related U.S. Application Data

(60) Provisional application No. 62/159,553, filed on May 11, 2015.

(51) Int. Cl.
*B61F 15/22* (2006.01)
*B61F 15/12* (2006.01)
(Continued)

(52) U.S. Cl.
CPC .............. *B61F 15/22* (2013.01); *B61F 15/02* (2013.01); *B61F 15/12* (2013.01); *F16C 35/063* (2013.01);
(Continued)

(58) Field of Classification Search
CPC ........... B61F 15/22; B61F 15/02; B61F 15/12
See application file for complete search history.

(56) References Cited

U.S. PATENT DOCUMENTS 7,219,938 B2 *    5/2007    Brister ................... B61F 15/22
295/42
8,696,212 B2 *    4/2014    Hubbard ............. B60B 27/0078
384/459

(Continued)

*Primary Examiner* — Thomas R. Hannon
(74) *Attorney, Agent, or Firm* — Mark Ussai; SKF USA Inc. Patent Dept.

(57) ABSTRACT

A backing ring assembly is for a railcar axle assembly including a shaft with a central axis and a bearing mounted on the shaft. An annular backing ring is disposeable upon the shaft between the bearing and a shaft enlarged section and has a central axis, an inner surface extending about the axis and defining a central bore for receiving the shaft and a retention surface facing away from the shaft enlarged section when the backing ring is disposed upon the shaft. A retainer includes an annular body, disposeable about the shaft enlarged section and having an inner surface sized to frictionally engage with the shaft enlarged section cylindrical surface, and at least one coupler connected with the annular body. The coupler(s) engage with the ring retention surface to releasably connect the retainer annular body with the backing ring to retain the ring at a fixed position on the shaft.

22 Claims, 15 Drawing Sheets

(51) Int. Cl.
*B61F 15/02* (2006.01)
*F16C 35/063* (2006.01)
*F16C 19/38* (2006.01)
(52) U.S. Cl.
CPC ........ *F16C 19/386* (2013.01); *F16C 2326/10* (2013.01)

(56) References Cited

U.S. PATENT DOCUMENTS 9,016,950 B2* 4/2015 Buchanan ................ B61F 15/22
 384/459
2012/0195540 A1* 8/2012 Hubbard ............... F16C 19/386
 384/572

* cited by examiner

US 9,789,887 B2

BACKING RING ASSEMBLY FOR RAILCAR AXLE BEARINGS

BACKGROUND OF THE INVENTION

The present invention relates to bearings, and more specifically backing rings used with railcar axle bearings.

Railcar axle assemblies typically include one or more bearings for rotatably coupling the axle shaft with the undercarriage of a railcar. In general, the axle shaft includes a journal section for receiving the bearing assembly, which is typically disposed within a housing connectable to a bogie or truck, and at least one enlarged section for mounting a wheel. A backing ring is generally used to support loading on the bearing assembly and is located at the transition between the two shaft sections.

SUMMARY OF THE INVENTION

In one aspect, the present invention is a backing ring assembly for a railcar axle assembly that includes a shaft with a central axis and a bearing mounted on the shaft. The shaft has an enlarged section with a generally cylindrical outer circumferential surface and a curved fillet section connecting the enlarged section with a remainder of the shaft. The backing ring assembly comprises a generally annular backing ring disposeable upon the shaft between the bearing and the shaft enlarged section. The backing ring has a central axis, an inner circumferential surface extending about the axis and defining a central bore for receiving a portion of the shaft and a retention surface facing generally away from the shaft enlarged section when the backing ring is disposed upon the shaft. A retainer includes a generally annular body disposeable about the shaft enlarged section, the annular body having an inner circumferential surface sized to frictionally engage with the shaft enlarged section cylindrical surface, and at least one coupler connected with the annular body. The coupler is configured to engage with the backing ring retention surface to releasably connect the retainer annular body with the backing ring, to thereby retain the ring at a substantially fixed axial position on the shaft.

In another aspect, the present invention is again a backing ring assembly for a railcar axle assembly including a shaft with a central axis and a bearing mounted on the shaft. The shaft has an enlarged section with a generally cylindrical outer circumferential surface and a curved fillet section connecting the enlarged section with a remainder of the shaft. The backing ring assembly comprises a generally annular backing ring disposeable upon the shaft between the bearing and the shaft enlarged section. The backing ring has a central axis and an inner circumferential surface extending about the axis and defining a central bore for receiving a portion of the shaft and an opposing outer circumferential surface. A retainer includes a generally annular body portion with an inner circumferential surface sized to frictionally engage with the shaft enlarged section cylindrical surface and a generally tubular coupler portion integrally formed with the annular body portion. The retainer tubular portion is disposeable about the backing ring outer surface and configured to engage with the backing ring to releasably connect the annular body portion with the backing ring, so as to retain the ring at a substantially fixed axial position on the shaft.

In a further aspect, the present invention is yet again a backing ring assembly for a railcar axle assembly, the axle assembly including a shaft with a central axis and a bearing mounted on the shaft. The shaft has an enlarged section with a generally cylindrical outer circumferential surface and a curved fillet section connecting the enlarged section with a remainder of the shaft. The backing ring assembly comprises a generally annular backing ring having opposing first and second axial ends and an inner circumferential surface defining a central bore for receiving a portion of the shaft such that the ring is disposed between the bearing and the shaft enlarged section. The ring inner surface includes a curved surface section juxtaposeable against the shaft fillet section when the backing ring is disposed on the shaft. The backing ring further having a generally radially-extending shoulder surface facing generally toward the bearing. A retainer includes a generally annular body disposed adjacent to the backing ring first axial end, the annular body having a central bore sized to frictionally engage with the shaft enlarged section cylindrical surface. The retainer further includes and generally tubular coupler disposeable about the backing ring and having a first end integrally formed with the annular body and a second end configured to engage with the backing ring shoulder surface to releasably connect the annular body with the ring so as substantially retain the backing ring at a fixed axial position on the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
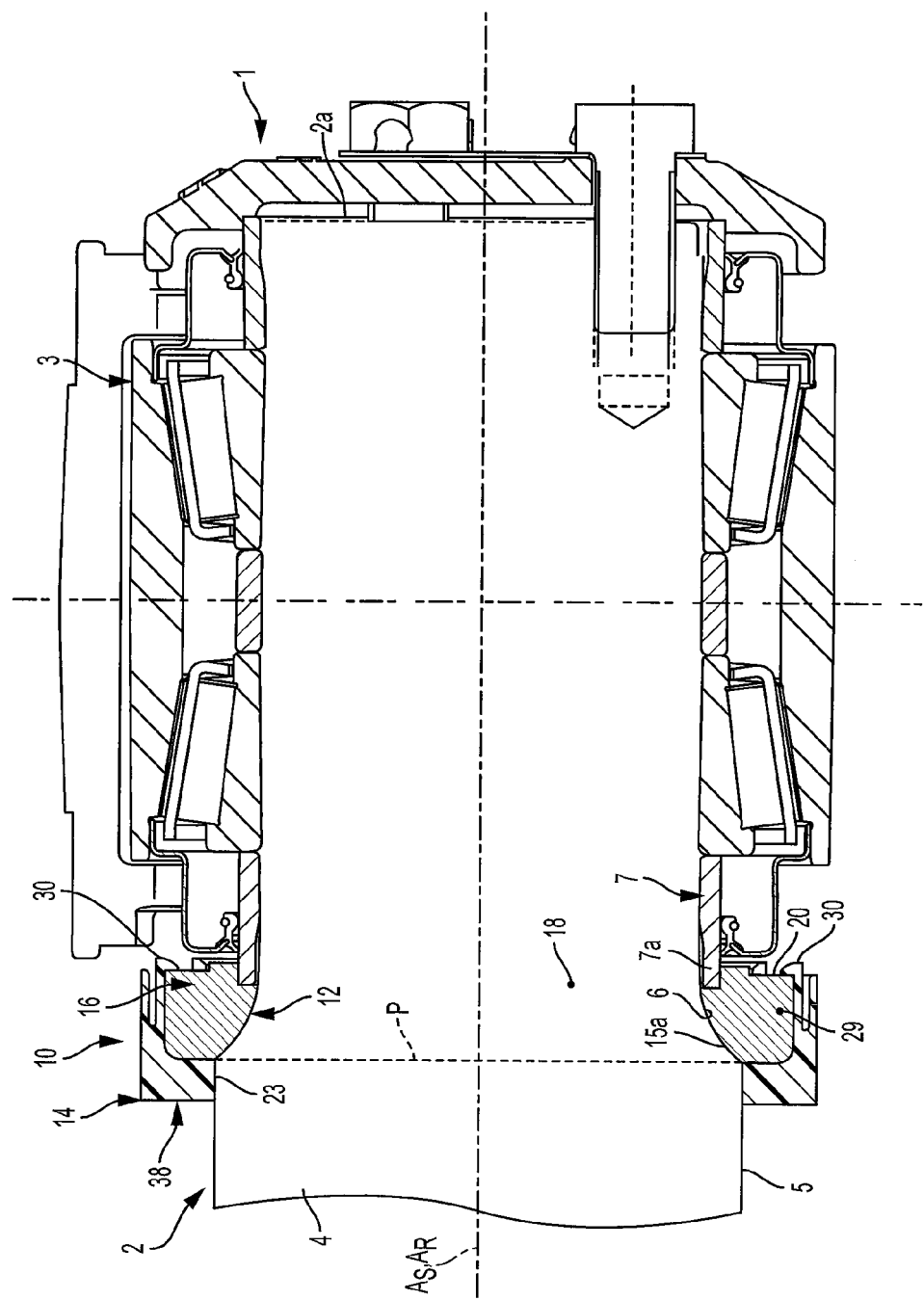
FIG. 1 is an axial cross-section of a railcar shaft bearing assembly including a backing ring assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-22 a backing ring assembly 10 for a railcar axle assembly 1, the axle assembly 1 including a shaft 2 with a central axis $A_S$ and a bearing 3 mounted on the shaft 2. The axle shaft 2 has an enlarged section 4 with a generally cylindrical outer circumferential surface 5 and a curved fillet section 6 connecting the enlarged section 4 with a remainder of the shaft 2. The backing ring assembly 10 basically comprises a generally annular backing ring 12, which is disposeable upon the shaft 2 between the bearing 3 and the shaft enlarged section 4, and a generally tubular retainer 14. The retainer 14 is configured to engage with the shaft enlarged section 4 and to retain the backing ring 12 at a fixed axial position on the shaft 2.

More specifically, the backing ring 12 includes a generally cylindrical body 16 having a central axis $A_R$ and first and second axial ends 16a, 16b spaced along the axis $A_R$. The backing ring body 16 has an inner circumferential surface 15 defining a central bore 18 for receiving a portion of the shaft 2 and an outer circumferential surface 17, the inner and outer surfaces 15, 17 extending axially between the ends 16a, 16b, respectively, and circumferentially about the axis $A_R$. Preferably, the backing ring inner surface 15 includes a curved surface section 15a (most preferably the entire surface 15) juxtaposeable against the shaft fillet section 6 when the backing ring 12 is disposed on the shaft 2, thereby enabling the backing ring 12 to fit closely adjacent to the enlarged section 4 of the shaft 2. Also, the backing ring body 16 is preferably formed such that the body first axial end 16a lies generally within or adjacent to a radial plane P (dashed lines FIGS. 1 and 2) through the intersection of the shaft enlarged section 4 and the shaft fillet section 6, such that the backing ring 12 does not extend over or "overlie" the shaft enlarged section 4.

Further, the backing ring 12 includes a generally radially-extending shoulder or retention surface 20 facing generally away from the shaft enlarged section 4, and thus facing generally toward the bearing 3, when the backing ring 12 and bearing 3 are disposed upon the shaft 2. The retention surface 20 preferably extends generally radially-inwardly from the ring outer surface 17 proximal to the body second axial end 16b, and is most preferably formed on the body second end 16b. Also, the shoulder surface 20 is preferably a substantially continuous, generally annular radial surface (as depicted), but may be formed as one or more generally arcuate surface sections and/or may extend partially axially with respect to the axis $A_R$. Preferably, the backing ring body 16 further has a generally annular shoulder 19 extending axially from the body second end 16b and defining a generally annular pocket 19a about the shaft for receiving an axial end 7a of an annular wear ring or sleeve 7 of the bearing assembly 3, as shown in FIGS. 1 and 2.

Furthermore, the retainer 14 preferably includes a generally annular body 22 disposeable about the shaft enlarged section 4 and at least one coupler 24 connected with the annular body 22 and configured to engage with the backing ring 12. The retainer annular body 22 has opposing outer and inner axial ends 22a, 22b, respectively, an inner circumferential surface 23A sized to frictionally engage with the shaft enlarged section cylindrical surface 5, and an opposing outer circumferential surface 23B. The at least one retainer coupler 24 is connected with the annular body inner end 22a and is preferably configured to engage with the backing ring radial retention surface 20 to releasably connect the retainer annular body 22 with the backing ring 12, so as to thereby retain the ring 12 at a substantially fixed axial position on the shaft 2. That is, the frictional engagement of the retainer annular body 22 with the shaft enlarged section 4 releasably affixes the retainer 14 on the shaft 2, such that the engagement of the retainer coupler 24 with the backing ring 12 thereby acts to axially fix/retain the backing ring 12 on the shaft 2.

Figure 2:
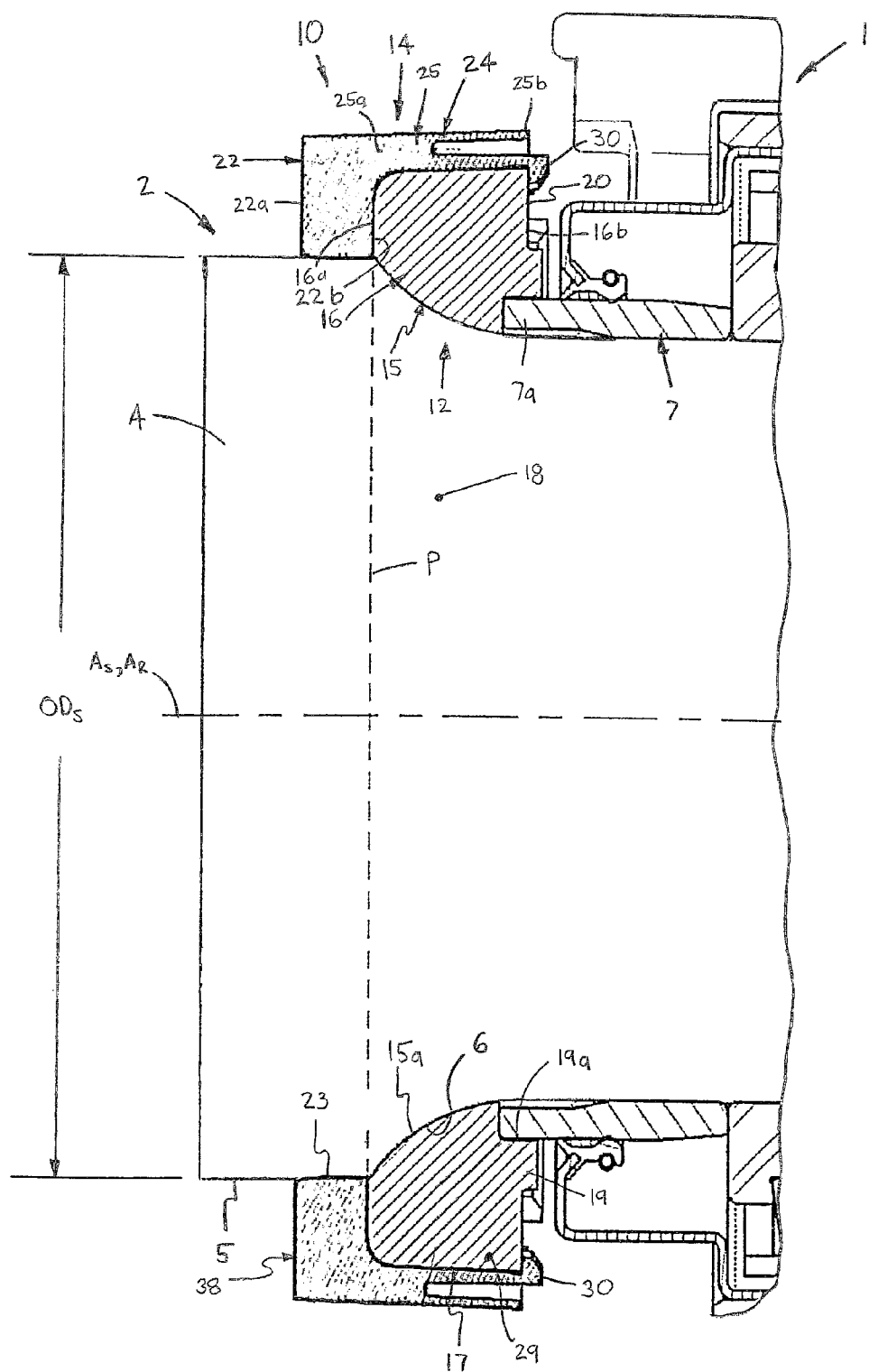
FIG. 2 is a broken-away, enlarged view of a portion of FIG. 1.
Figure 4:
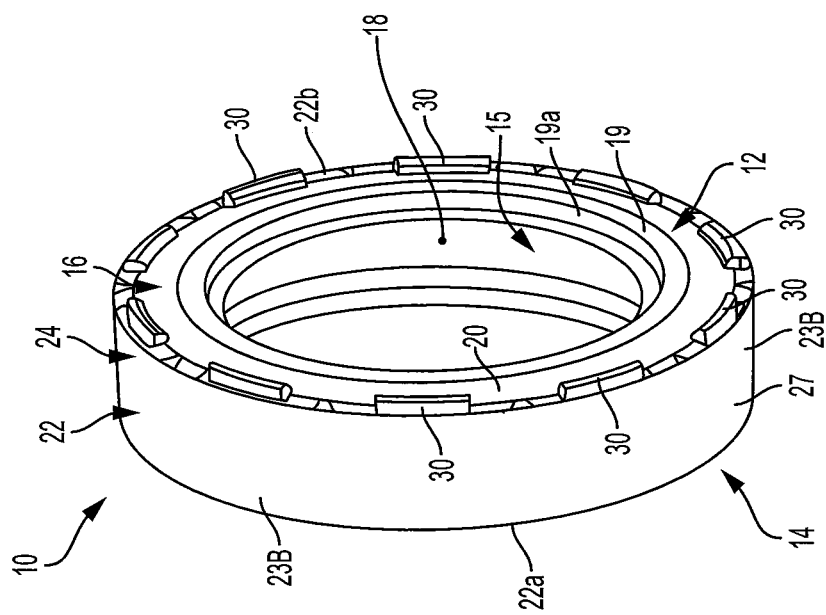
FIG. 4 is a rear perspective view of the backing ring assembly.
Figure 3:
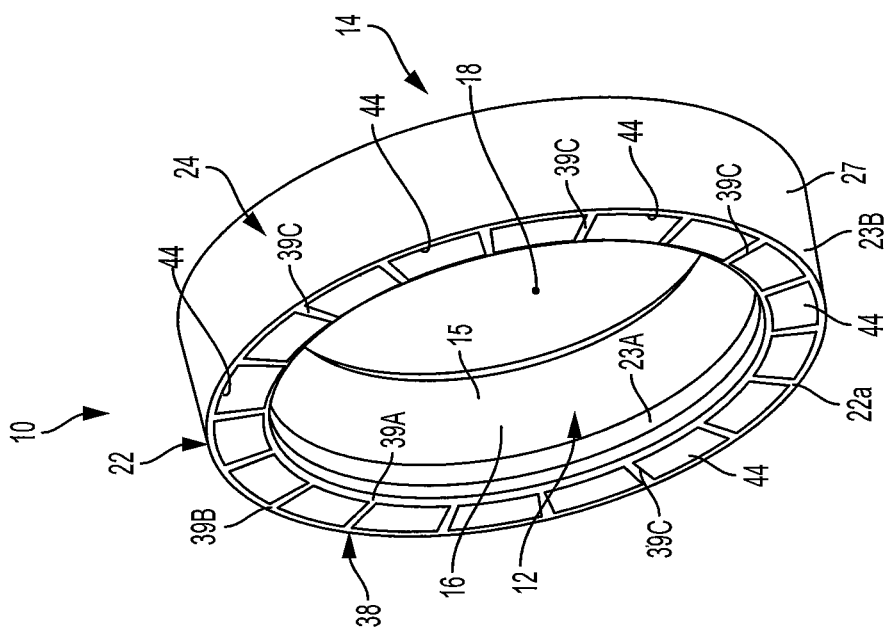
FIG. 3 is a front perspective view of the backing ring assembly, shown separate from a railcar shaft.
Figure 5:
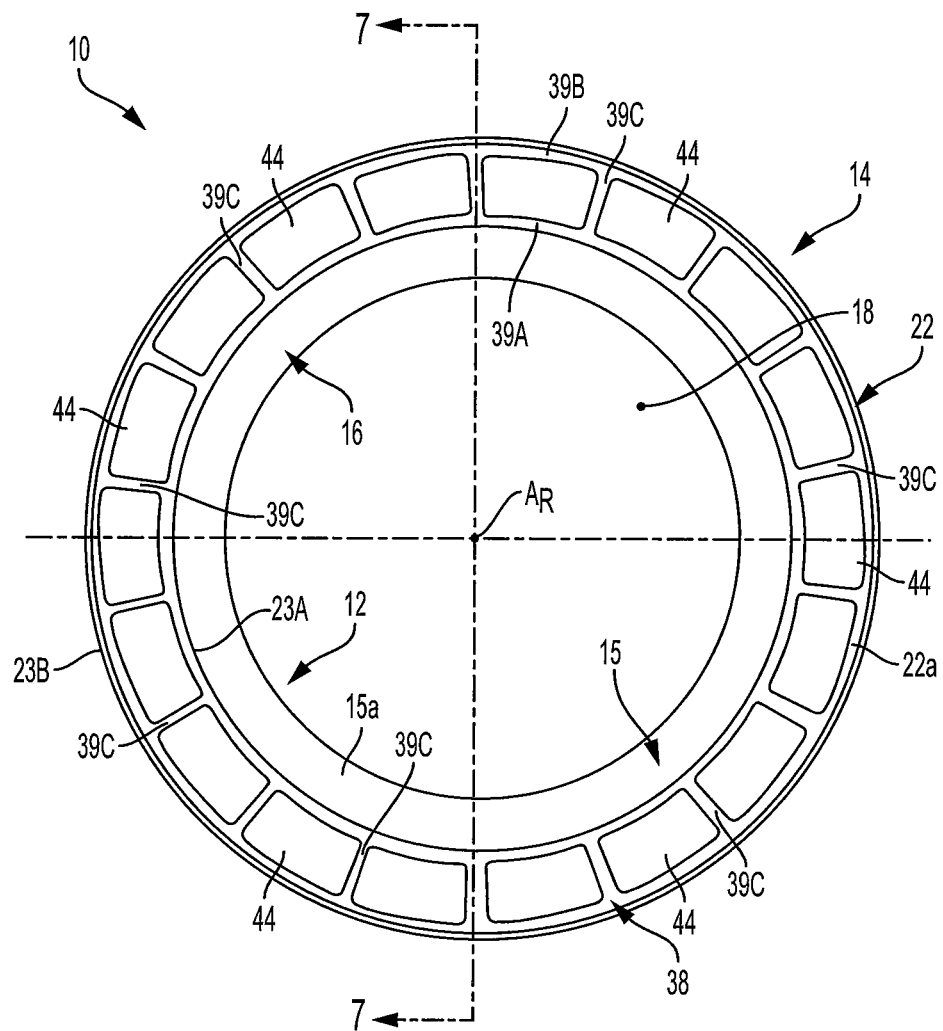
FIG. 5 is a front plan view of the backing ring assembly.
Figure 6:
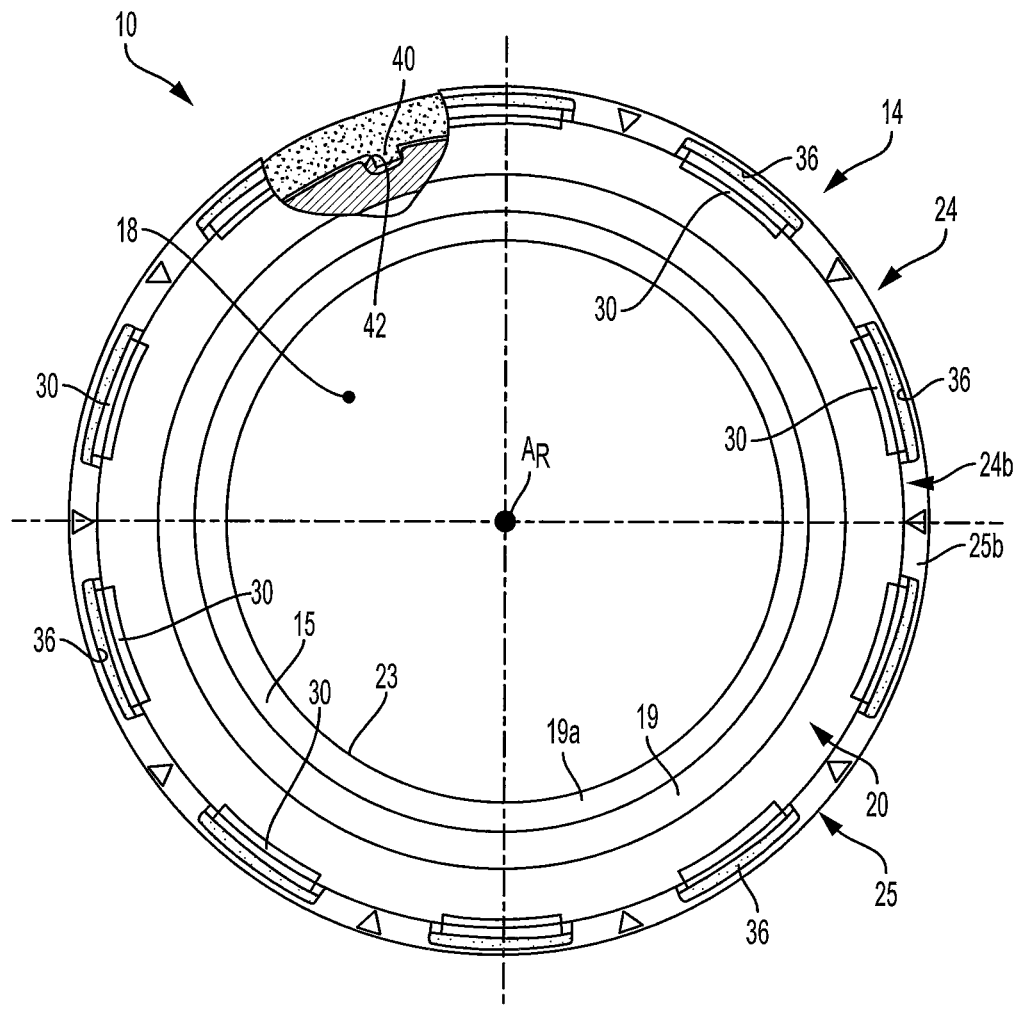
FIG. 6 is a rear plan view of the backing ring assembly.
Figure 8:
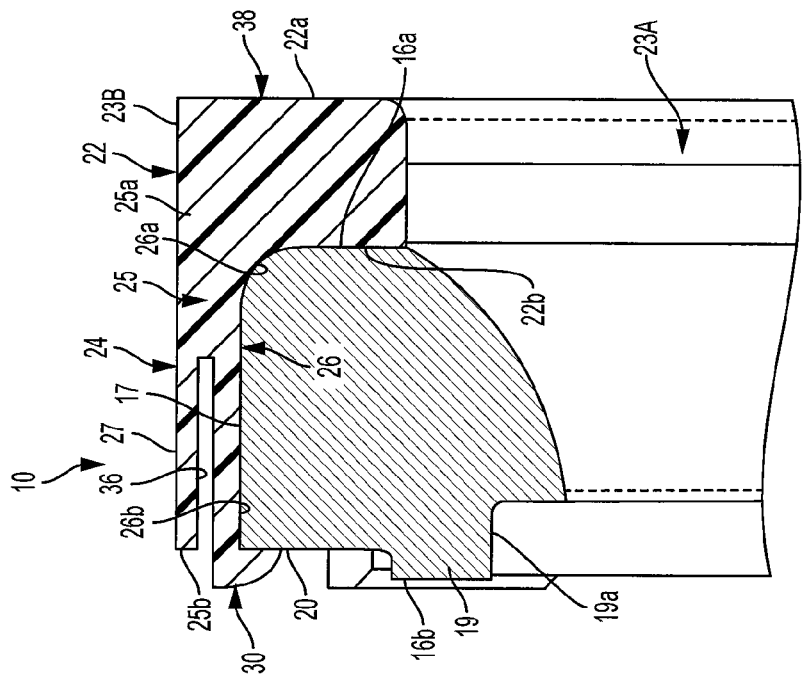
FIG. 8 is a broken-away, enlarged view of a portion of FIG. 7.
Figure 7:
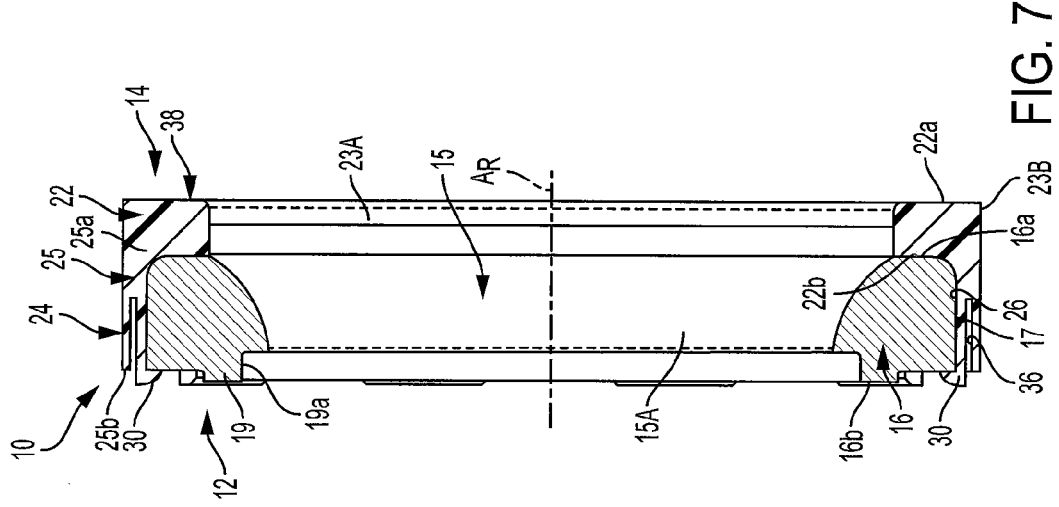
FIG. 7 is an axial cross-sectional view of the backing ring assembly taken through line 7-7 of FIG. 5.
Figure 10:
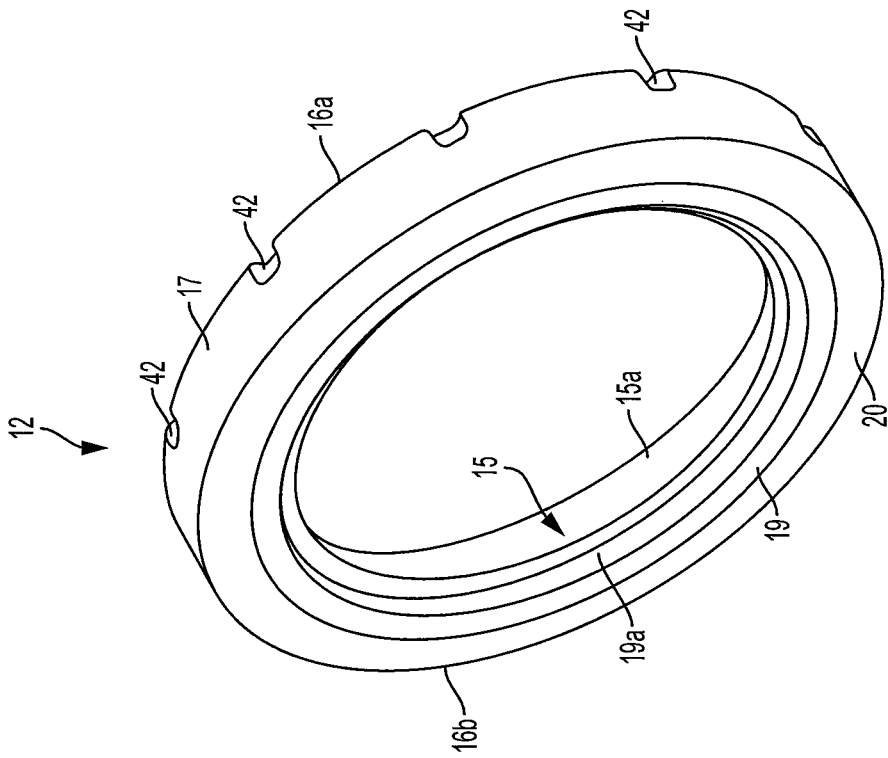
FIG. 10 is a rear perspective view of the backing ring.
Figure 9:
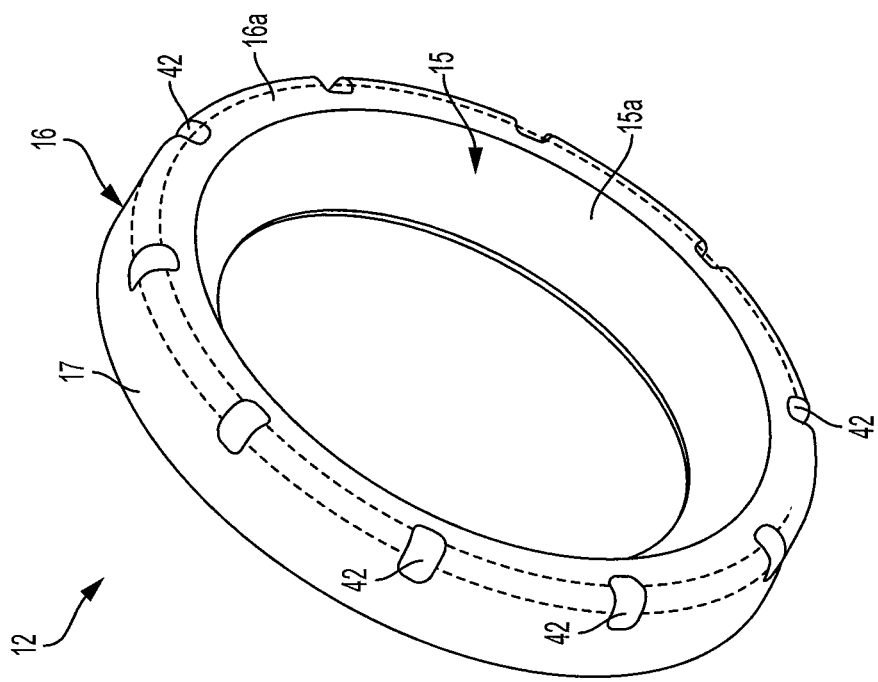
FIG. 9 is a front perspective view of a backing ring of the backing ring assembly.
Figure 12:
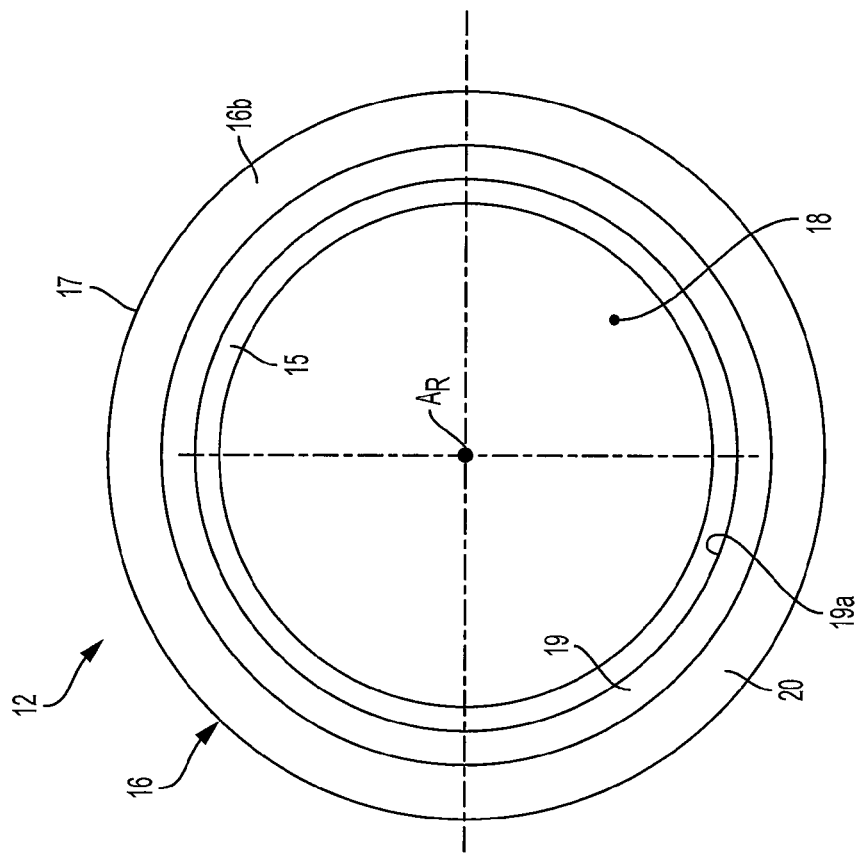
FIG. 12 is a rear plan view of the backing ring.
Figure 11:
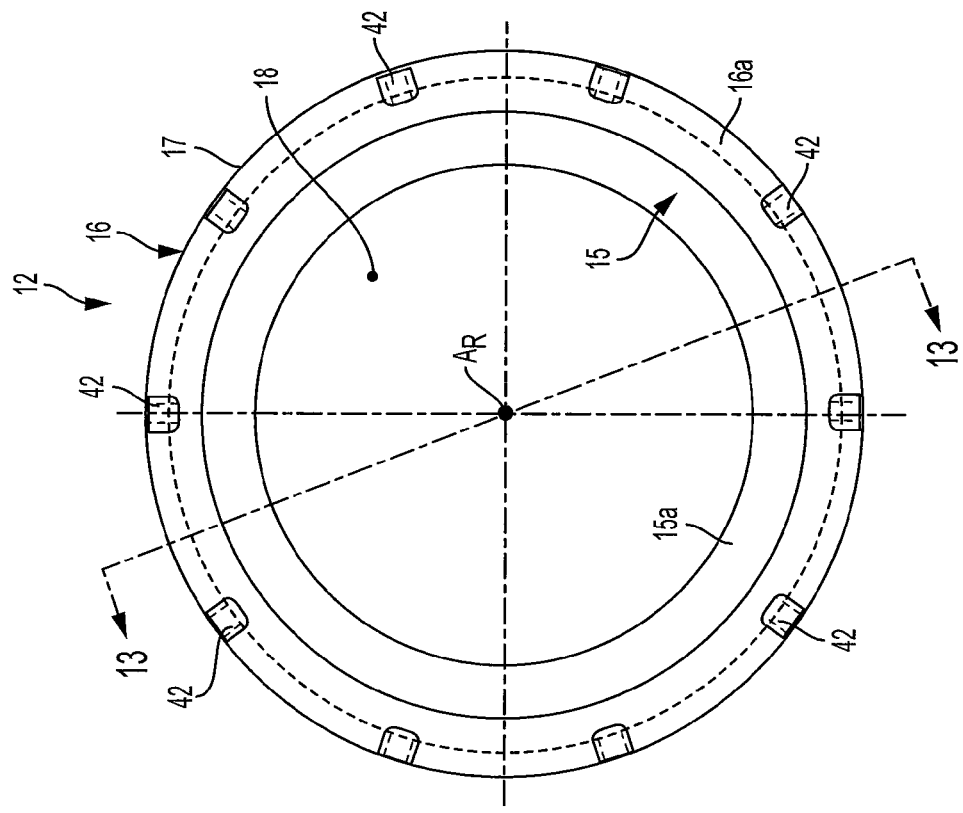
FIG. 11 is a front plan view of the backing ring.

Referring particularly to FIGS. 1 and 2, at least the annular body 22 of the retainer 14, and most preferably the entire retainer 14 as discussed below, is formed of a substantially expansible material, such as for example, a polymeric material, a metallic material, etc. As such, the central bore 18 of the retainer 14 is adapted to separately receive one of a plurality of shafts 2 of different sizes or dimensions. Specifically, each shaft 2 includes an enlarged section 4 with an outside diameter $OD_S$ (FIG. 2), which may have a value different than the value of the enlarged section outside diameter $OD_S$ of each other one of the plurality of shafts 2. Thus, the retainer 14 is capable of receiving or engaging with a number of different shafts each formed with an enlarged section 4 having an outside diameter $OD_S$ within a range of values. As such, the backing ring assembly 10 is adaptable for use with a variety of shafts 2.

Also, due at least partially to the expansibility of the retainer annular body 22, the annular body inner surface 23 is configured to sealingly engage with the shaft enlarged section outer surface 5. Preferably, the sealing engagement is enhanced by forming at least the annular body 22 of a polymeric material, by providing a polymeric inner liner to a metallic annular body 22, or by any other appropriate means for increasing sealing between the annular body 22 and the shaft enlarged section 4. In any case, the sealing engagement between the retainer 14 and the shaft 2 functions to prevent the ingress of water or other liquids into the portion of the shaft 2 enclosed by the backing ring assembly 10, which could otherwise lead to oxidation of the metallic backing ring 12.

Referring now to FIGS. 2, 6-8, 16 and 18-22, the retainer coupler 24 preferably includes a generally tubular body 25 connected with the retainer annular body 22 and disposeable about the backing ring cylindrical body 16. Alternatively, the retainer coupler 24 may be formed of a plurality of elongated tabs (not shown) each having a first end integrally formed with the retainer body 22 and an opposing second, free end engageable with the backing ring retention surface 20. With the preferred construction, the tubular body 25 has a first end 25a connected with the retainer annular body second end 22b, a second end 25b engageable with the backing ring shoulder surface 20, an inner circumferential surface 26 disposeable about the backing ring outer circumferential surface 17 and defining an open central bore 29, and an opposing outer circumferential surface 27. When the preferred retainer 14 is installed on the backing ring 12, the coupler tubular body second end 25b is located at least generally proximal to the backing ring second axial end 16b and is configured to engage with the retention shoulder surface 20, as described in detail below. Preferably, the retainer coupler tubular body 25 is integrally formed with the retainer annular body 22, such that the annular body 22 and the coupler 24 are integral portions of a one-piece construction retainer 14. Alternatively, the coupler tubular body 25 may be attached to a separate annular body 22 by any appropriate means (e.g., fasteners, adhesives, plastic welding, etc.).

Figure 14:
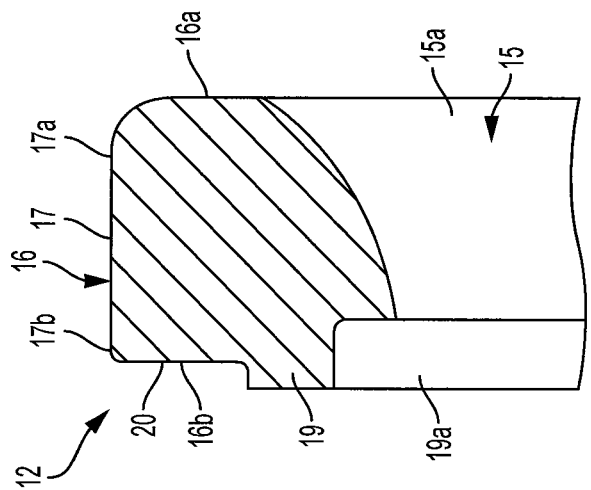
FIG. 14 is a broken-away, enlarged view of a portion of FIG. 13.
Figure 13:
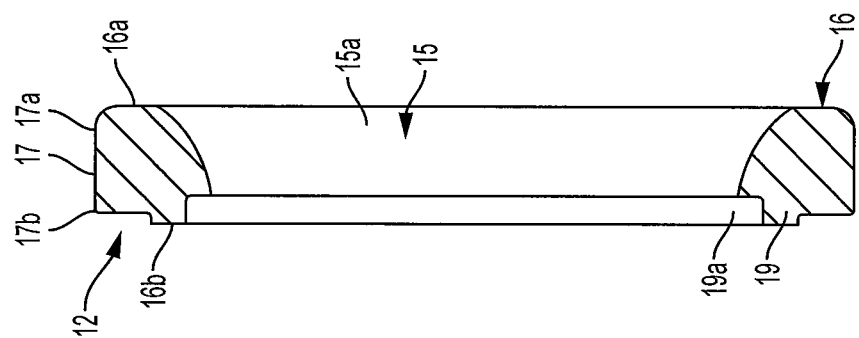
FIG. 13 is an axial cross-sectional view of the backing ring assembly taken through line 13-13 of FIG. 11.
Figure 15:
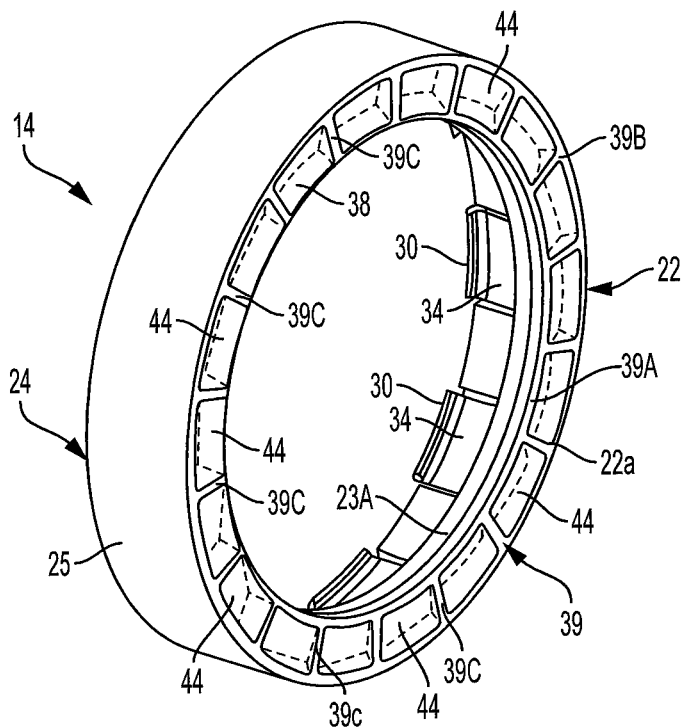
FIG. 15 is a front perspective view of a retainer of the backing ring assembly.
Figure 16:
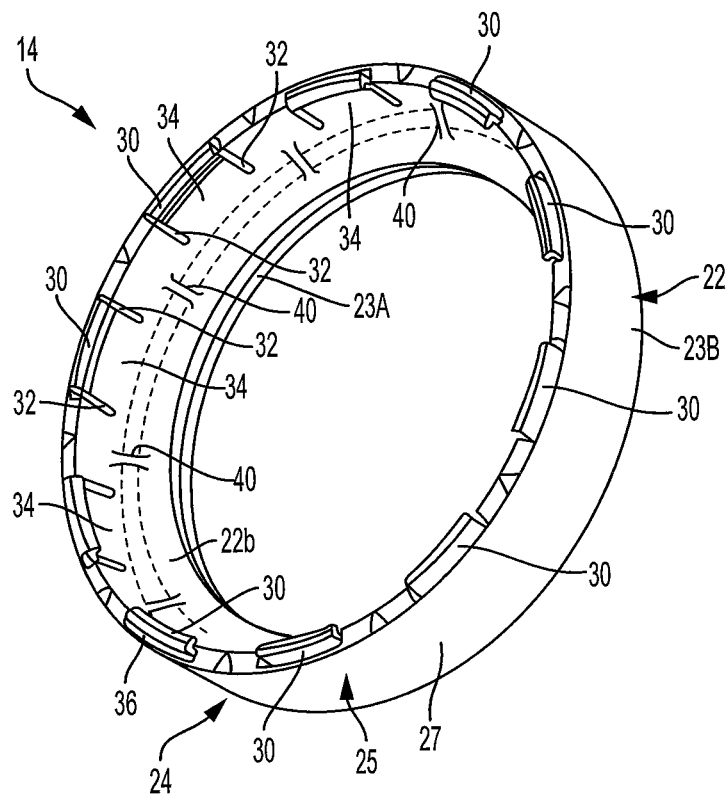
FIG. 16 is a rear perspective view of the retainer.

In any case, at least a portion of the preferred retainer coupler tubular body 25 is configured to deflect generally radially when installing the retainer 14 onto the backing ring 12, and alternatively when removing the retainer 14 from the backing ring 12, such that the retainer coupler tubular body 25 is configured to fit closely about the backing ring cylindrical body 16. Most preferably, the backing ring cylindrical body 16 is preferably formed with an axially-extending taper such that such that outer circumferential surface 17 is generally frustoconical. Specifically, the body outer surface 17 preferably extends generally axially between a first, diametrically-smaller axial edge 17a proximal to the backing ring first axial end 16a and a second, diametrically-larger axial edge 17b proximal to the backing ring second axial end 16b, the retention shoulder surface extending radially-inwardly from the second axial edge 17b, as indicated in FIGS. 13 and 14.

Figure 19:
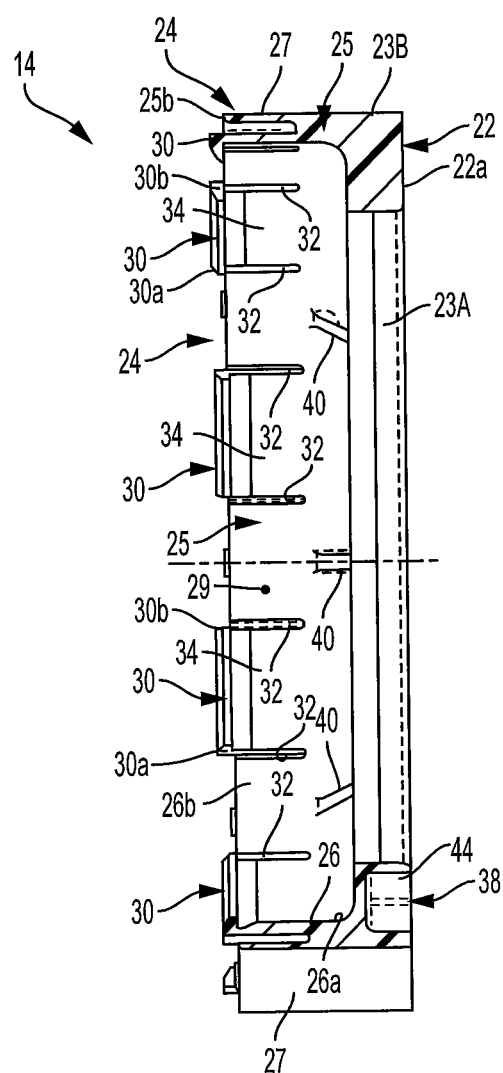
FIG. 19 is an axial cross-sectional view of the retainer taken through line 19-19 of FIG. 17.
Figure 20:
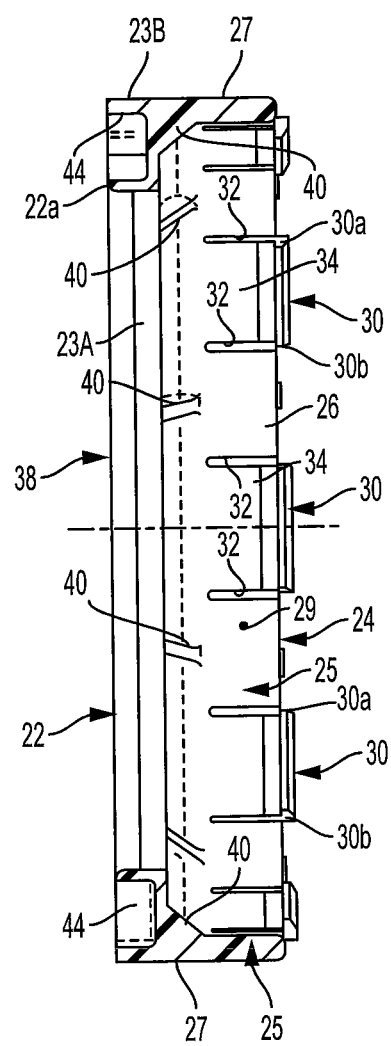
FIG. 20 is an axial cross-sectional view of the retainer taken through line 20-20 of FIG. 18.
Figure 21:
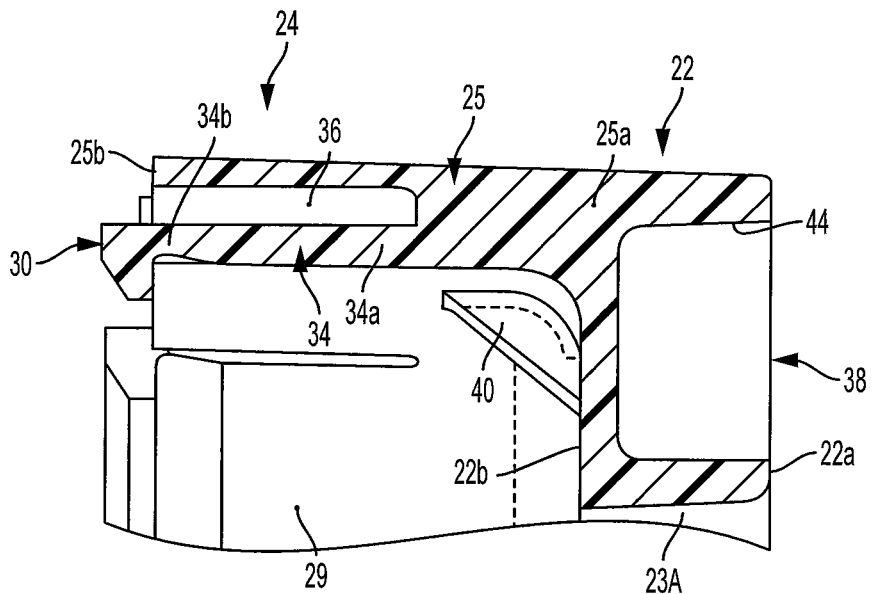
FIG. 21 is a broken-away, enlarged view of a portion of FIG. 19.

With such a backing ring structure, at least the inner surface 26, and most preferably the entire tubular body 25, of the preferred retainer coupler 24 is generally frustoconical and sized to be closely disposed or juxtaposed about the backing ring outer surface 17. More particularly, the inner circumferential surface 26 of the retainer coupler tubular body 25 has a first, diametrically-smaller axial edge 26a proximal to the retainer annular body 22 and an opposing second, diametrically-larger axial edge 26b, as indicated in FIG. 19. The smaller edge 26a of the tubular body inner surface 26 is sized slightly larger than the smaller edge 17a of the backing ring outer surface 17 and the larger edge 26b of the tubular body inner surface 26 is slightly larger than the second edge 17b of the backing ring outer surface 27.

As such, the backing ring 12 and retainer 14 are formed such that the retainer coupler 24 encapsulates the backing ring 12 to prevent ingress of fluids between the ring 12 and coupler 24. In addition, the complementary frustoconical structures of the backing ring 12 and the retainer coupler 24 facilitates installation of the retainer 14 onto the backing ring 12, as discussed in detail below. Preferably, the retainer 14 further includes a plurality circumferentially spaced apart anti-rotation ribs 40 each extending between the coupler body inner surface 27 and the inner end 22b of the coupler body 22. Each rib 40 is disposeable with in a separate one of a plurality of locator pockets 42 formed on the first axial end 16 of the backing ring body 16 so as to prevent relative angular displacement between the retainer 14 and the backing ring 12.

Figure 22:
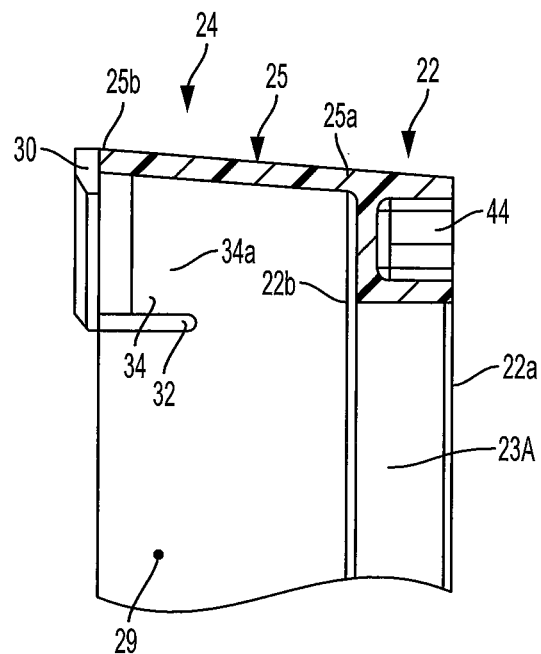
FIG. 22 is a broken-away, enlarged axial cross-sectional view of an alternative construction of the retainer.
Figure 23:
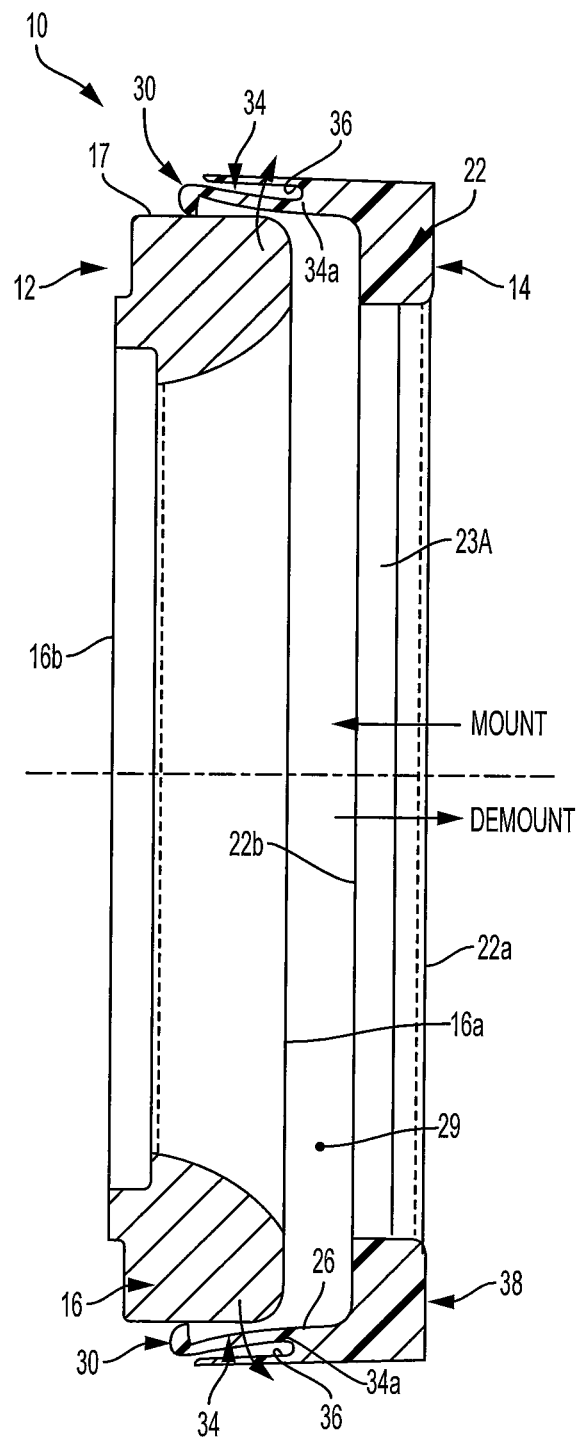
FIG. 23 is an axial cross-sectional view of the backing ring assembly showing the process of mounting and demounting of the retainer from the backing ring.

As best shown in FIGS. 16 and 18-23, the retainer coupler 24 preferably includes at least one engagement lip 30 extending radially inwardly from the tubular body second end 25b and disposeable against the backing ring retention surface 20. Preferably, the retainer coupler 24 includes a plurality of generally arcuate lips 30 with opposing circumferential ends 30a, 30b, the lips 30 being spaced circumferentially apart about the ring central axis $A_R$. Alternatively, the retainer coupler body 25 may include only a single, continuous annular lip (not shown). Preferably, the tubular body 25 has a plurality of pairs of parallel slotted openings 32 extending axially inwardly from the body second end 25b at a separate circumferential end 30a, 30b of each lip 30. Each pair of openings 32 defines a separate one of a plurality of generally arcuate, generally rectangular mounting tabs 34. Each mounting tab 34 carries a separate one the arcuate retainer lips 30 and is generally deflectable with respect to a remainder of the body 25 in generally radial directions to displace the connected lip 30 into engagement with, and alternatively to disengage from, the backing ring retention surface 20. Specifically, each tab 34 has an inner end 34a integrally connected with the remainder of the body 25 and is bendable thereabout in the manner of a cantilever beam to generally radially displace the opposing second, outer end 34b, and thereby also the connected engagement lip 30, as depicted in FIG. 23.

Further, the tubular body 25 preferably also has a plurality of generally arcuate pockets 36 extending axially inwardly from the body second end and located radially outwardly from each mounting tab 34, each pair of slotted openings 32 extending radially into an adjacent one of the pockets 36. The pockets 36 enable the radial thickness of each mounting tab 34 to be substantially reduced, which thereby facilitates radial deflection of each tab 34, and provides an enclosed space for such movement of the adjacent tab 34 to prevent damage thereto. However, the tubular body 25 may alternatively be formed with a radial thickness substantially lesser than as generally shown in FIGS. 16-21 and with the slotted openings 32 extending through the entire body thickness, such that the mounting tabs 34 are not enclosed by any pockets, as depicted in FIG. 22.

Figure 17:
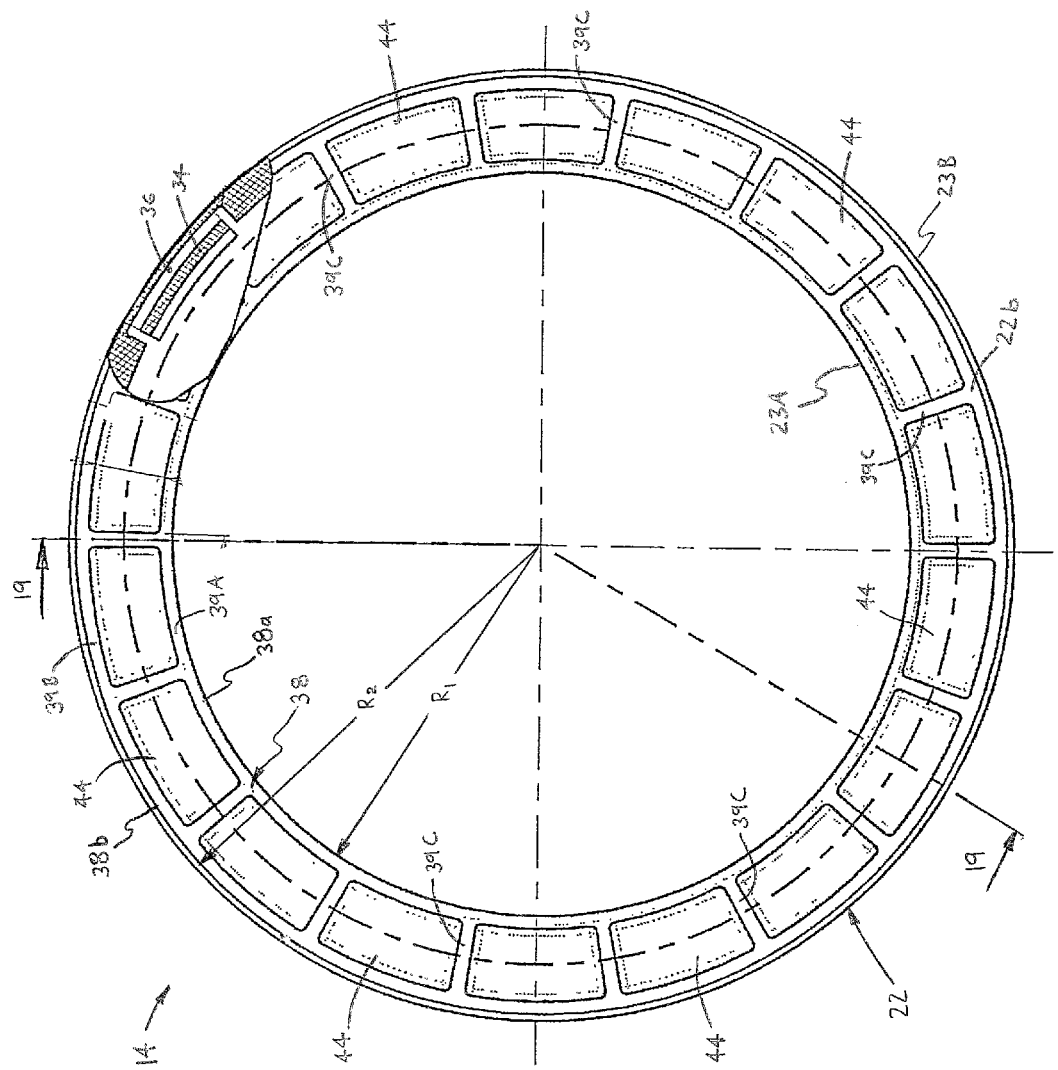
FIG. 17 is a front plan view of the retainer.
Figure 18:
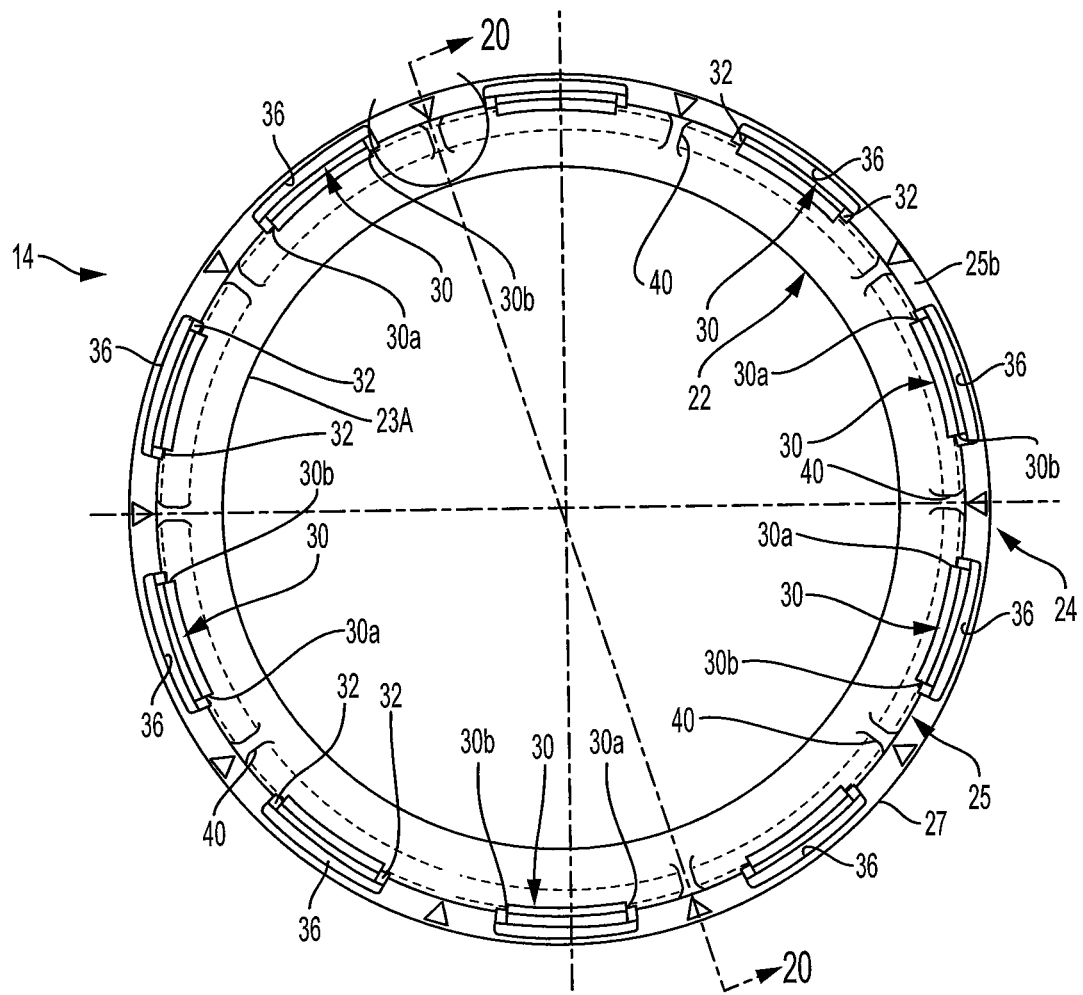
FIG. 18 is a rear plan view of the retainer.

Referring now to FIGS. 1-3, 5, 7, 8 and 15-20, the retainer annular body 22 preferably has a substantially radially-extending demount surface 38 on the outer axial end 22a. The demount surface 38 preferably extends circumferentially and radially along the entire body outer end 22a, but may be formed on only a radial section of the outer end 22a or even on discrete arcuate surface portions (neither shown). Further, the demount surface 38 is engageable by a disassembly tool (not shown) to axially displace the retainer body 22 off of the shaft enlarged section 4, and thereby the backing ring 12 along the shaft 2 for removal therefrom. Preferably, as indicated in FIG. 17, the demount surface 38 has an inner edge 38a with a first radius $R_1$ and an outer edge 38b with a second radius $R_2$, with the difference between the value of the second radius $R_2$ and the value of the first radius $R_1$ being at least seven hundred fifty thousandths of an inch (0.750"). As such, the backing ring assembly 10 is capable of achieving railcar industry requirements for user demounting.

As depicted in FIGS. 3, 5, 15 and 17, the retainer annular body 22 preferably further has at least one and most preferably a plurality of lightening cavities 44 extending generally axially inwardly from one of the two axial ends 22a or 22b. The one or more cavities 44 are provided to reduce the amount of material required to form the annular body 22, which is advantageous for certain fabrication techniques, such as injection molding, and reduces material costs and product weight. When the cavities 44 are formed extending inwardly from the outer end 22a, as shown in FIGS. 3, 5, 15 and 17, the demount surface 38 is collectively formed of lower and upper circumferential sections 39A, 39B and a plurality of radial sections 39C extending between the circumferential sections 39A, 39B.

Referring to FIGS. 1, 2 and 23, the backing ring assembly 10 is preferably assembled generally as follows. First, the first, smaller diameter axial end 16a of the backing ring body 16 is inserted into the central bore 29 of the preferred retainer tubular body 25, and then the backing ring body 16 is axially displaced through the retainer bore 29 substantially the entire body 16 is disposed within the bore 29. At this point, the one or more preferred engagement lips 30 of the retainer coupler 24 deflect radially outwardly then inwardly to engage with the backing ring retention surface 20. Due to the complementary tapers of the backing ring outer surface 17 and the retainer tubular body inner surface 26, the insertion of the backing ring 12 into the retainer 14 is greatly facilitated by a clearance space that is present until the surfaces 17, 28 become substantially juxtaposed.

In any case, when the retainer 14 is installed on the backing ring 12, the backing ring assembly 10 is then mounted onto the railcar axle shaft 2 by inserting an end 2a (FIG. 1) of the shaft 2 through the backing ring bore 18, then axially displacing the entire assembly 10 toward the shaft enlarged section 4 until the retainer annular body 22 engages circumferentially about the shaft enlarged section 4 and the backing ring 12 is disposed against the shaft fillet section 6. At this point, the entire backing ring assembly 10 is retained on the shaft 2 by the frictional engagement of the retainer inner surface 23A and the shaft outer surface 5.

Alternatively, although not preferred, the backing ring assembly 10 could be assembled by first installing the retainer 14 on the shaft 2 (i.e., by engaging the annular body 22 on the shaft enlarged section 4). Then, the backing ring 12 is installed on the shaft 2 and displaced axially toward the shaft enlarged section 4 until the ring 12 is disposed within the bore 29 of the retainer coupler 24.

When desired to demount the backing assembly 10, a disassembly tool (not shown) is engaged with the retainer demount surface 38 and a pulling force is applied to axially displace the entire backing ring assembly 10 until the retainer inner surface 23A disengages from the outer surface 5 of the shaft enlarged section 4. At this point, the entire backing ring assembly 10 may be axially displaced or "slid" along the shaft axis $A_S$ until the backing ring 12 is separated from the shaft 2. The retainer 24, which is preferably formed of a relatively inexpensive material (e.g., nylon, polyethylene terephthalate, etc.) may be discarded and replaced with a new retainer 14 if desired, while reusing the backing ring 12, which may be formed of relatively more expensive material, such as a metallic material (e.g., low carbon steel).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A backing ring assembly for a railcar axle assembly, the axle assembly including a shaft with a central axis and a bearing mounted on the shaft, the shaft having an enlarged section with a generally cylindrical outer circumferential surface and a curved fillet section connecting the enlarged section with a remainder of the shaft, the backing ring assembly comprising:
a generally annular backing ring disposeable upon the shaft between the bearing and the shaft enlarged section and having a central axis, an inner circumferential surface extending about the axis and defining a central bore for receiving a portion of the shaft and a retention surface facing generally away from the shaft enlarged section when the backing ring is disposed upon the shaft; and
a retainer including a generally annular body disposeable about the shaft enlarged section, the annular body having an inner circumferential surface sized to frictionally engage with the shaft enlarged section cylindrical surface, an outer circumferential surface and a radial thickness defined between the inner and outer surfaces, and at least one coupler connected with the annular body and configured to engage with the backing ring retention surface to releasably connect the retainer annular body with the backing ring so as to retain the ring at a substantially fixed axial position on the shaft;
wherein the retainer coupler includes a generally tubular body having a first end connected with the retainer annular body, a second end engageable with the backing ring retention surface, an inner circumferential surface disposeable about the ring outer circumferential surface, an opposing outer circumferential surface and a radial thickness defined between the inner and outer surfaces, the coupler tubular body radial thickness being substantially lesser than the retainer annular body radial thickness such that the tubular body inner surface is spaced radially-outwardly with respect to the retainer annular body inner surface.

2. The backing ring assembly as recited in claim 1 wherein the inner circumferential surface of the retainer annular body defines a central bore and at least the annular body of the retainer is formed of a substantially expansible material such that the central bore is adapted to separately receive one of a plurality of shafts, each shaft including an enlarged section with an outside diameter having a value different than a value of the outside diameter of the enlarged section of each other one of the plurality of shafts.

3. The backing ring assembly as recited in claim 2 wherein the retainer annular body is formed of one of a polymeric material and a metallic material.

4. The backing ring assembly as recited in claim 1 wherein the retainer annular body inner surface is configured to sealingly engage with the shaft enlarged section outer surface.

5. The backing ring assembly as recited in claim 1 wherein the at least one retainer coupler is integrally formed with the retainer annular body.

6. The backing ring assembly as recited in claim 1 wherein the backing ring has first and second axial ends and an outer circumferential surface extending generally axially between the first and second ends, the retention surface extending generally radially-inwardly from the ring outer surface proximal to the ring second axial end.

7. The backing ring assembly as recited in claim 6 wherein:
the backing ring outer circumferential surface is generally frustoconical and extends generally axially between a first, diametrically-smaller axial edge proximal to the backing ring first axial end and a second, diametrically-larger axial edge proximal to the backing ring second axial end; and
the retainer coupler includes a generally frustoconical tubular body sized to be disposed about the backing ring outer surface, the coupler body having a first, diametrically-smaller end connected with the retainer main body and a second, diametrically-larger end, the retainer body second end being located at least generally proximal to the backing ring second axial end when the retainer is installed about the body and configured to engage with the retention surface.

8. The backing ring as recited in claim 6 wherein the retainer coupler includes a generally tubular body having a first end connected with the retainer annular body, a second end engageable with the backing ring retention surface and an inner circumferential surface disposeable about the ring outer circumferential surface.

9. The backing ring as recited in claim 8 wherein at least a portion of the retainer coupler tubular body is configured to deflect generally radially when installing the retainer onto the backing ring and alternatively when removing the retainer from the backing ring.

10. The backing ring assembly as recited in claim 8 wherein the retainer coupler tubular body includes at least one generally arcuate lip extending radially inwardly from the tubular body second end and disposeable against the backing ring retention surface.

11. The backing ring assembly as recited in claim 10 wherein the at least one retainer coupler lip includes a plurality of the lips spaced circumferentially apart about the ring central axis.

12. The backing ring as recited in claim 10 wherein the at least one lip has opposing circumferential ends and the retainer coupler tubular body has at least two, generally parallel slotted openings each disposed adjacent to a separate one of the lip circumferential ends and extending axially from the tubular body second end and toward the tubular body first end, the two slotted openings defining a generally arcuate tab, the tab being generally radially displaceable with respect to a remainder of tubular body to displace the arcuate lip in generally radial directions.

13. The backing ring assembly as recited in claim 1 wherein the retainer annular body includes outer and inner axial ends, the retainer coupler being connected with the body inner end, and a substantially radially-extending demount surface on the outer axial end, the demount surface being engageable by a removal tool to axially displace the retainer body off of the shaft enlarged section and the backing ring along the shaft.

14. The backing ring assembly as recited in claim 1 wherein the retainer coupler includes a generally tubular body having a first end connected with the retainer annular body, a second end engageable with the backing ring retention surface and an inner circumferential surface disposeable about the ring outer circumferential surface.

15. The backing ring assembly as recited in claim 14 wherein the retainer coupler tubular body includes at least one generally arcuate lip extending radially inwardly from the tubular body second end and disposeable against the backing ring retention surface.

16. The backing ring assembly as recited in claim 15 wherein the at least one lip has opposing circumferential ends and the retainer coupler tubular body further has at least two, generally parallel slotted openings each disposed adjacent to a separate one of the lip circumferential ends and extending axially from the tubular body second end and toward the tubular body first end, the two slotted openings defining a generally arcuate tab, the tab being generally radially displaceable with respect to a remainder of tubular body to displace the arcuate lip in generally radial directions.

17. The backing ring assembly as recited in claim 1 wherein the retainer coupler has a first end connected with the retainer annular body, a second, opposing end proximal to the backing ring retention surface and at least one generally arcuate lip extending generally radially inwardly from the coupler second end and disposeable against with the backing ring retention surface.

18. The backing ring assembly as recited in claim 1 wherein the backing ring has an outer axial end and an opposing inner axial end, the inner axial end being disposed adjacent to an intersection of the shaft fillet and the shaft enlarged section such that the backing ring is spaced axially from the cylindrical surface of the shaft enlarged section, and the backing ring inner surface including a curved surface section juxtaposeable against the shaft fillet section when the backing ring is disposed on the shaft.

19. A backing ring assembly for a railcar axle assembly, the axle assembly including a shaft with a central axis and a bearing mounted on the shaft, the shaft having an enlarged section with a generally cylindrical outer circumferential surface and a curved fillet section connecting the enlarged section with a remainder of the shaft, the backing ring assembly comprising:
a generally annular backing ring disposeable upon the shaft between the bearing and the shaft enlarged section and having a central axis, an inner circumferential surface extending about the axis and defining a central bore for receiving a portion of the shaft and a retention surface facing generally away from the shaft enlarged section when the backing ring is disposed upon the shaft; and
a retainer including a generally annular body disposeable about the shaft enlarged section, the annular body having an inner circumferential surface sized to frictionally engage with the shaft enlarged section cylindrical surface, and at least one coupler connected with the annular body and configured to engage with the backing ring retention surface to releasably connect the retainer annular body with the backing ring so as to retain the ring at a substantially fixed axial position on the shaft;
wherein the backing ring has first and second axial ends and an outer circumferential surface extending generally axially between the first and second ends, the retention surface extending generally radially-inwardly from the ring outer surface proximal to the ring second axial end, the backing ring outer circumferential surface is generally frustoconical and extends generally axially between a first, diametrically-smaller axial edge proximal to the backing ring first axial end and a second, diametrically-larger axial edge proximal to the backing ring second axial end; and
wherein the retainer coupler includes a generally frustoconical tubular body sized to be disposed about the backing ring outer surface, the coupler body having a first, diametrically-smaller end connected with the retainer main body and a second, diametrically-larger end, the retainer body second end being located at least generally proximal to the backing ring second axial end when the retainer is installed about the body and configured to engage with the retention surface.

20. A backing ring assembly for a railcar axle assembly, the axle assembly including a shaft with a central axis and a bearing mounted on the shaft, the shaft having an enlarged section with a generally cylindrical outer circumferential surface and a curved fillet section connecting the enlarged section with a remainder of the shaft, the backing ring assembly comprising:

a generally annular backing ring disposeable upon the shaft between the bearing and the shaft enlarged section and having a central axis, an inner circumferential surface extending about the axis and defining a central bore for receiving a portion of the shaft and a retention surface facing generally away from the shaft enlarged section when the backing ring is disposed upon the shaft; and a retainer including a generally annular body disposeable about the shaft enlarged section, the annular body having an inner circumferential surface sized to frictionally engage with the shaft enlarged section cylindrical surface, and at least one coupler connected with the annular body and configured to engage with the backing ring retention surface to releasably connect the retainer annular body with the backing ring so as to retain the ring at a substantially fixed axial position on the shaft;

wherein the backing ring has first and second axial ends and an outer circumferential surface extending generally axially between the first and second ends, the retention surface extending generally radially-inwardly from the ring outer surface proximal to the ring second axial end; and wherein the retainer coupler includes a generally tubular body having a first end connected with the retainer annular body, a second end engageable with the backing ring retention surface and an inner circumferential surface disposeable about the ring outer circumferential surface, at least a portion of the retainer coupler tubular body being configured to deflect generally radially when installing the retainer onto the backing ring and alternatively when removing the retainer from the backing ring.

21. A backing ring assembly for a railcar axle assembly, the axle assembly including a shaft with a central axis and a bearing mounted on the shaft, the shaft having an enlarged section with a generally cylindrical outer circumferential surface and a curved fillet section connecting the enlarged section with a remainder of the shaft, the backing ring assembly comprising:

a generally annular backing ring disposeable upon the shaft between the bearing and the shaft enlarged section and having a central axis, an inner circumferential surface extending about the axis and defining a central bore for receiving a portion of the shaft and a retention surface facing generally away from the shaft enlarged section when the backing ring is disposed upon the shaft; and a retainer including a generally annular body disposeable about the shaft enlarged section, the annular body having an inner circumferential surface sized to frictionally engage with the shaft enlarged section cylindrical surface, and at least one coupler connected with the annular body and configured to engage with the backing ring retention surface to releasably connect the retainer annular body with the backing ring so as to retain the ring at a substantially fixed axial position on the shaft;

wherein the backing ring has first and second axial ends and an outer circumferential surface extending generally axially between the first and second ends, the retention surface extending generally radially-inwardly from the ring outer surface proximal to the ring second axial end; and wherein the retainer coupler includes a generally tubular body having a first end connected with the retainer annular body, a second end engageable with the backing ring retention surface, an inner circumferential surface disposeable about the ring outer circumferential surface, and a plurality of generally arcuate lips spaced circumferentially apart about the ring central axis, each lip extending radially inwardly from the tubular body second end and disposeable against the backing ring retention surface.

22. A backing ring assembly for a railcar axle assembly, the axle assembly including a shaft with a central axis and a bearing mounted on the shaft, the shaft having an enlarged section with a generally cylindrical outer circumferential surface and a curved fillet section connecting the enlarged section with a remainder of the shaft, the backing ring assembly comprising:

a generally annular backing ring disposeable upon the shaft between the bearing and the shaft enlarged section and having a central axis, an inner circumferential surface extending about the axis and defining a central bore for receiving a portion of the shaft and a retention surface facing generally away from the shaft enlarged section when the backing ring is disposed upon the shaft; and a retainer including a generally annular body disposeable about the shaft enlarged section, the annular body having an inner circumferential surface sized to frictionally engage with the shaft enlarged section cylindrical surface, and at least one coupler connected with the annular body and configured to engage with the backing ring retention surface to releasably connect the retainer annular body with the backing ring so as to retain the ring at a substantially fixed axial position on the shaft;

wherein the backing ring has first and second axial ends and an outer circumferential surface extending generally axially between the first and second ends, the retention surface extending generally radially-inwardly from the ring outer surface proximal to the ring second axial end; and wherein the retainer coupler includes a generally tubular body having a first end connected with the retainer annular body, a second end engageable with the backing ring retention surface, an inner circumferential surface disposeable about the ring outer circumferential surface, at least one generally arcuate lip extending radially inwardly from the tubular body second end and disposeable against the backing ring retention surface, the at least one lip having opposing circumferential ends, and at least two, generally parallel slotted openings each disposed adjacent to a separate one of the lip circumferential ends and extending axially from the tubular body second end and toward the tubular body first end, the two slotted openings defining a generally arcuate tab, the tab being generally radially displaceable with respect to a remainder of tubular body to displace the arcuate lip in generally radial directions.

* * * * *